(12) United States Patent
Lehtonen

(10) Patent No.: US 12,030,412 B1
(45) Date of Patent: Jul. 9, 2024

(54) INTEGRATED CARGO AND HEADREST COVER

(71) Applicant: NO SACRIFICE BAGS INC., King (CA)

(72) Inventor: Donna Lee Elizabeth Lehtonen, Schomberg (CA)

(73) Assignee: NO SACRIFICE BAGS INC., King (CA)

( * ) Notice: Subject to any disclaimer, the term of this patent is extended or adjusted under 35 U.S.C. 154(b) by 0 days.

(21) Appl. No.: 18/545,078

(22) Filed: Dec. 19, 2023

(51) Int. Cl.
*B60N 2/60* (2006.01)
*B60R 11/00* (2006.01)

(52) U.S. Cl.
CPC .............. *B60N 2/60* (2013.01); *B60R 11/00* (2013.01); *B60R 2011/0071* (2013.01)

(58) Field of Classification Search
CPC ... B60N 2/60; B60R 2011/0071; B60R 11/00; A47C 7/386
USPC ............................................ 297/220, 228.12
See application file for complete search history.

(56) References Cited

U.S. PATENT DOCUMENTS

| | | |
|---|---|---|
| 910,238 A | 1/1909 | Shaw |
| 1,014,004 A | 1/1912 | Chester |
| D86,533 S | 3/1932 | Mix |
| 3,540,775 A | 11/1970 | Max |
| 4,125,211 A | 11/1978 | Handsman |
| D299,792 S | 2/1989 | Winter |
| 4,862,563 A | 9/1989 | Flynn |
| 4,982,885 A | 1/1991 | Severson et al. |
| 5,044,538 A | 9/1991 | Bader |
| 5,104,076 A | 4/1992 | Goodall, Jr. |
| 5,142,743 A | 9/1992 | Hahn |
| 5,174,483 A | 12/1992 | Moore, IV et al. |
| 5,312,160 A | 5/1994 | Davis et al. |
| 5,345,633 A * | 9/1994 | Harnish ................. B60N 2/879 5/639 |

(Continued)

FOREIGN PATENT DOCUMENTS

| | | | |
|---|---|---|---|
| DE | 102004056361 A1 | 7/2006 | |
| GB | 2179852 A * | 3/1987 | ............. A47C 7/383 |

(Continued)

OTHER PUBLICATIONS

Philadelphia Eagles Headrest Cover by Fanmats—Sports Licensing Solutions, LLC, retrieved on Feb. 27, 2023, online, https://www.fanmats.com/nfl-philadelphia-eagles-head-rest-cover (Year: 2023).

(Continued)

*Primary Examiner* — Milton Nelson, Jr.
(74) *Attorney, Agent, or Firm* — Kintner IP, LLC; Mary Frances Ludwig

(57) ABSTRACT

An integrated cargo and headrest cover includes a headrest cover that conforms to a vehicle headrest and an elongated strap extending downwardly from the headrest cover, the elongated strap being configured to secure cargo to the vehicle seat. The system reduces shifting of cargo while driving, providing protection for the cargo and reducing driving hazards. The strap includes a plurality of couplers positioned in offset relation for releasably securing the strap to the cargo and for adjusting the strap. A cargo cover may be connected to the strap to conceal and provide additional protection for the cargo.

19 Claims, 9 Drawing Sheets

(56) References Cited

U.S. PATENT DOCUMENTS

| | | | |
|---|---|---|---|
| 5,383,588 A | 1/1995 | Kazel | |
| 5,425,485 A | 6/1995 | Carlo | |
| D360,440 S | 7/1995 | Banks et al. | |
| 5,483,860 A | 1/1996 | Adams | |
| 5,535,928 A | 7/1996 | Herring | |
| 5,542,590 A | 8/1996 | Pfitzenmaier | |
| 5,664,712 A | 9/1997 | Smrt | |
| 5,667,272 A | 9/1997 | Sutton | |
| 5,727,842 A | 3/1998 | O'neil | |
| 5,749,325 A | 5/1998 | Albanese | |
| 6,030,034 A * | 2/2000 | Plohetski | A47C 7/383 297/229 |
| 6,049,953 A | 4/2000 | Mccay et al. | |
| 6,260,748 B1 | 7/2001 | Lindsey | |
| 6,378,746 B1 | 4/2002 | Miller | |
| 6,606,768 B2 | 8/2003 | Henry et al. | |
| D492,107 S | 6/2004 | Brown | |
| 6,783,175 B1 * | 8/2004 | Henderson | A45F 4/06 297/219.1 |
| 6,896,164 B2 | 5/2005 | Fialla-Dori | |
| 6,966,470 B1 | 11/2005 | Charlton | |
| D553,801 S | 10/2007 | Palasini | |
| 7,309,102 B1 | 12/2007 | Davis | |
| D602,204 S | 10/2009 | Rusley | |
| 7,766,422 B2 | 8/2010 | Edwards et al. | |
| 7,841,453 B2 | 11/2010 | Gold et al. | |
| 7,891,733 B1 | 2/2011 | Clarke | |
| D658,113 S | 4/2012 | Henderson | |
| D675,023 S | 1/2013 | Colgan | |
| D712,294 S | 9/2014 | Wright | |
| 8,875,965 B2 | 11/2014 | Corets | |
| 9,102,276 B1 | 8/2015 | Virgin | |
| 9,199,580 B2 | 12/2015 | Lehtonen | |
| D759,468 S | 6/2016 | Rothbaum et al. | |
| 9,463,752 B1 | 10/2016 | Lehtonen | |
| 9,623,806 B2 | 4/2017 | Rodriguez | |
| 9,756,917 B2 | 9/2017 | Zech et al. | |
| 9,914,005 B2 | 3/2018 | Zandman-Zeman et al. | |
| 9,930,985 B2 | 4/2018 | Daring | |
| 10,017,125 B2 | 7/2018 | Frazier | |
| 10,081,306 B2 | 9/2018 | Zaccaria et al. | |
| 10,231,384 B2 | 3/2019 | Edwards et al. | |
| 10,632,880 B2 | 4/2020 | Lehtonen | |
| D946,312 S | 3/2022 | Li | |
| D970,263 S | 11/2022 | Yang | |
| D978,535 S | 2/2023 | Lehtonen | |
| D997,565 S | 9/2023 | Lehtonen | |
| 2002/0008125 A1 | 1/2002 | Caputi | |
| 2003/0121944 A1 | 7/2003 | Scanlan et al. | |
| 2004/0206868 A1 | 10/2004 | Kaufman | |
| 2008/0035687 A1 | 2/2008 | Beaulieu | |
| 2008/0073948 A1 | 3/2008 | Livingston et al. | |
| 2011/0248057 A1 | 10/2011 | Schmitz | |
| 2013/0229045 A1 | 9/2013 | Agustin | |
| 2014/0326762 A1 | 11/2014 | Nolan | |
| 2015/0298619 A1 | 10/2015 | Parisi | |
| 2015/0021369 A1 | 12/2015 | Lehtonen et al. | |
| 2016/0355139 A1 | 12/2016 | Noonan et al. | |
| 2017/0008460 A1 | 1/2017 | Rodriguez | |
| 2019/0217785 A1 | 7/2019 | Nolan | |
| 2022/0371522 A1 | 11/2022 | Lehtonen | |

FOREIGN PATENT DOCUMENTS

| | | | | |
|---|---|---|---|---|
| GB | 2264438 A | * | 9/1993 | B60N 2/48 |
| GB | 2254363 A | | 4/1994 | |
| GB | 2325956 A | | 8/2000 | |
| GB | 2404905 A | | 2/2005 | |
| GB | 6209955 | | 5/2022 | |
| JP | H1199884 A | | 4/1999 | |
| JP | 2001347891 A | | 12/2001 | |
| JP | 2002036959 A | | 2/2002 | |
| JP | 2002067811 A | | 3/2002 | |
| JP | 2003335177 A | | 11/2003 | |
| JP | 3181869 U | | 2/2013 | |
| JP | 2009214646 A | | 3/2013 | |
| WO | WO-0038946 A1 * | | 7/2000 | B60N 2/4879 |
| WO | WO-2007141358 A | * | 12/2007 | A47C 7/386 |

OTHER PUBLICATIONS

No Sacrifice Bags, Handbag care accessories, posted at instagram. com, first available Aug. 30, 2021, retrieved on Nov. 23, 2022, online, https://www.instagram.com/p/CTNuuvcIHRs/ (Year: 2021).
The purse snatcher strap by No Sacrifice Bags, posted at amazon. com, first available Jun. 15, 2018, retrieved on Nov. 23, 2022, online, https://www.amazon.com/Snatcher-Secure-Designer-Safely-Available/dp/B07DRLDSQ6?ref_=ast_sto_dp (Year: 2018).

* cited by examiner

INTEGRATED CARGO AND HEADREST COVER

CROSS REFERENCE TO RELATED APPLICATION

None

TECHNICAL FIELD

The present invention pertains generally to holding cargo inside of a vehicle, and more particularly to an integrated cargo and headrest cover system for use with a vehicle seat.

BACKGROUND OF THE INVENTION

Vehicle owners commonly like to protect the materials of the vehicle headrests, such as leather or fabric, from degradation that may occur from exposure to hair oils, perspiration, ultraviolet light, and other sources. Headrest covers provide convenient protection for the headrest, and can often be maintained by removing and washing. Many drivers also like to decorate their vehicle interior as an expression of their individual personal style, such as with school colors, favorite sports team logos, or similar.

Passengers seats in vehicles are often used to hold various items such as handbags, take-out food, groceries, backpacks, briefcases, laptops, baby bags, or car organization caddies. However, items transported in this manner are subject to sudden shifts, which may damage the item or the vehicle interior, or present a potentially dangerous driving distraction or safety hazard. For example, during a hard-braking maneuver, cargo may be thrown from its resting position and interfere with the driver's ability to control the vehicle. There is therefore a need in the art to restrain cargo on a vehicle seat.

Furthermore, cargo being transported on a vehicle seat, such as a handbag or briefcase, may be expensive or may include sensitive materials, such as leather. The owner of the cargo may be concerned about having the cargo exposed on the seat, where it could be subjected to ultraviolet radiation and visible to potential thieves. There is therefore a need to provide concealment and protection for cargo being transported on a vehicle seat.

BRIEF SUMMARY OF THE EMBODIMENTS

Embodiments disclosed herein are directed to an integrated cargo and headrest cover which allows a driver to secure their bag, or other cargo, on the seat of the vehicle, so that they can remain focused on the road, and minimize the distracted driving which may occur when reaching for cargo that may suddenly shift on the seat, such as during a braking or turning maneuver. The integrated cargo and headrest cover system includes a headrest cover designed to fit on both the type of headrest that is separated from the body of the seat (e.g., adjustable) or a headrest that is integrated into the seat (e.g., non-adjustable). Embodiments include a cargo cover designed to conceal the cargo and, in some cases, protect the cargo from ultraviolet radiation.

According to one or more embodiments an integrated cargo and headrest cover system for cooperation with a vehicle headrest and cargo includes: a headrest cover structurally configured to conform to the vehicle headrest, the headrest cover having a front surface and a rear surface; an elongated strap extending downwardly from the front surface of the headrest cover; a plurality of couplers positioned in offset relation along the elongated strap, the plurality of couplers including a first coupler and a second coupler, wherein the elongated strap is releasably securable to itself via the first coupler and the second coupler to form a loop; and a cargo cover connected to the elongated strap above the loop, the cargo cover shaped and dimensioned to cover the loop and the cargo.

According to one or more embodiments of the system, the elongated strap has an exterior surface, and the first coupler and the second coupler are positioned such that when the first coupler is secured to the second coupler both of the first coupler and the second coupler are oriented away from the exterior surface.

According to one or more embodiments of the system, the cargo cover includes an aperture located substantially in a center of the cargo cover; and the cargo cover is connected to the elongated strap by passing the elongated strap through the aperture.

According to one or more embodiments of the system, the cargo cover includes a grommet substantially surrounding the aperture.

According to one or more embodiments of the system, the cargo cover includes a cover fastener extending from an outer edge of the cargo cover to the aperture.

According to one or more embodiments of the system, the cargo cover is slidingly positionable along a length of the elongated strap.

According to one or more embodiments of the system, the elongated strap is removably connected to the headrest cover.

According to one or more embodiments of the system, the elongated strap is removably connected to the headrest cover by a fastener located on an interior of the front surface of the headrest cover.

According to one or more embodiments of the system, the elongated strap is unitarily formed with the headrest cover.

According to one or more embodiments of the system, the elongated strap and the headrest cover are formed of an elastic material.

According to one or more embodiments of the system, a lower end of the headrest cover includes a conformable portion.

According to one or more embodiments of the system, the cargo cover is substantially opaque to ultraviolet light.

According to one or more embodiments, a headrest cover and cargo securing system for cooperation with a vehicle headrest and a cargo includes: a headrest cover structurally configured to conform to the vehicle headrest, the headrest cover having a front surface and a rear surface; an elongated strap extending downwardly from the front surface of the headrest cover; and a plurality of couplers positioned in offset relation along the elongated strap, the plurality of couplers including a first coupler and a second coupler, wherein the elongated strap is releasably securable to itself via the first coupler and the second coupler to form a loop.

According to one or more embodiments of the system, the elongated strap has an exterior surface, and the first coupler and the second coupler are positioned such that when the first coupler is secured to the second coupler both of the first coupler and the second coupler are oriented away from the exterior surface.

According to one or more embodiments of the system, the elongated strap is removably connected to the headrest cover.

According to one or more embodiments of the system, the elongated strap is unitarily formed with the headrest cover.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the integrated cargo and headrest cover are described with reference to the following figures, wherein like reference numerals refer to like parts throughout the various views unless otherwise specified.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

DETAILED DESCRIPTION OF THE INVENTION

The detailed description describes non-limiting exemplary embodiments. Any individual features may be combined with other features as required by different applications for at least the benefits described herein. As used herein, the term "about" means plus or minus 10% of a given value unless specifically indicated otherwise. As used herein, the terms "substantially" or "substantially the same" mean that two items are at least 90% the same; for example, a feature described as "substantially parallel" may be parallel to within 90%, an element described as "substantially circular" may be circular to within 90%, and so on.

In the present disclosure, many features are described as being optional, e.g. through the use of the verb "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features, or with all three of the three possible features.

As used herein, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

As used herein, disclosure of a singular element is also a disclosure of a plural element and vice versa unless otherwise noted.

Figure 1:
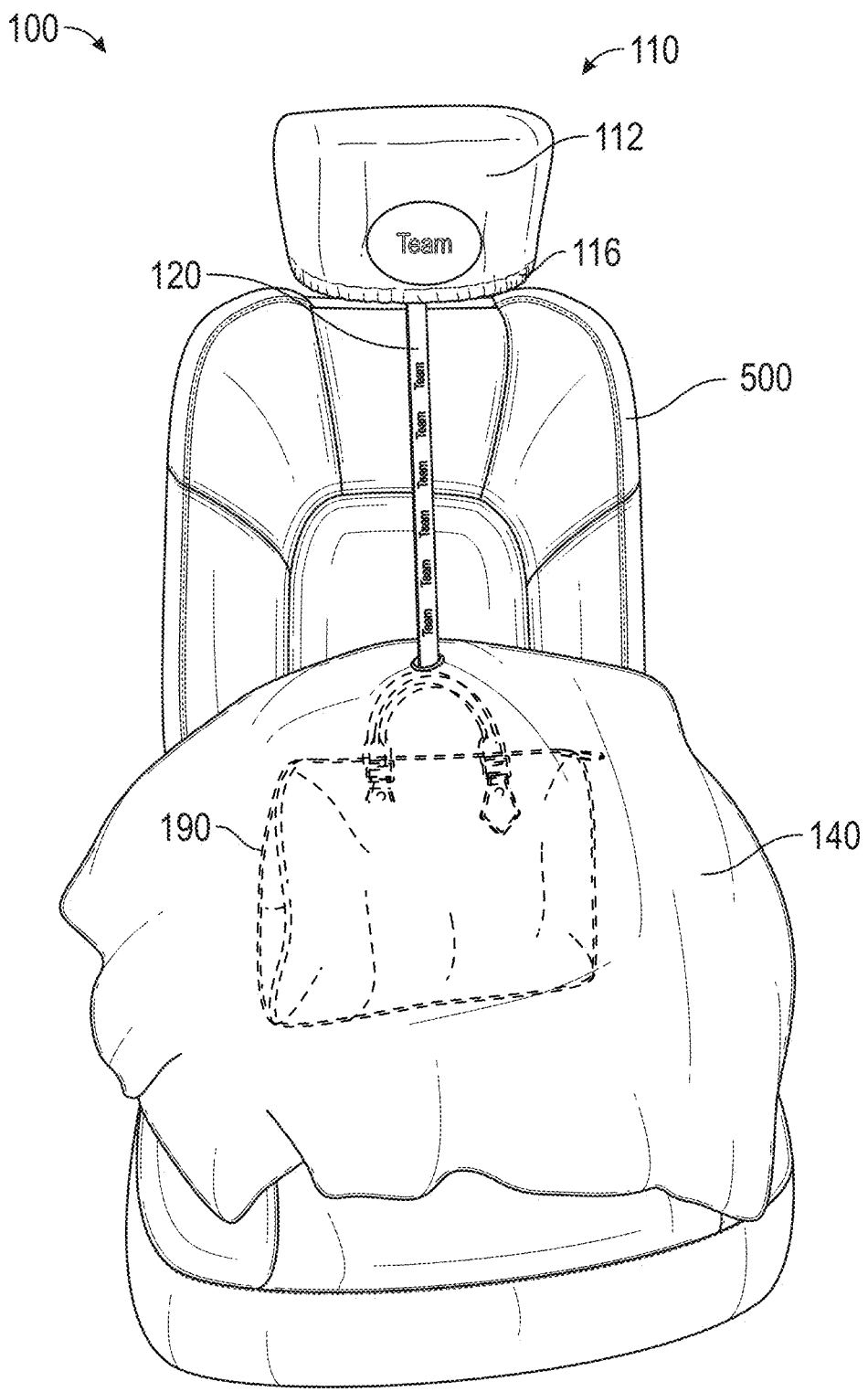
FIG. 1 is an example illustration of a front view of an integrated cargo and headrest cover, in accordance with a representative embodiment.
Figure 2:
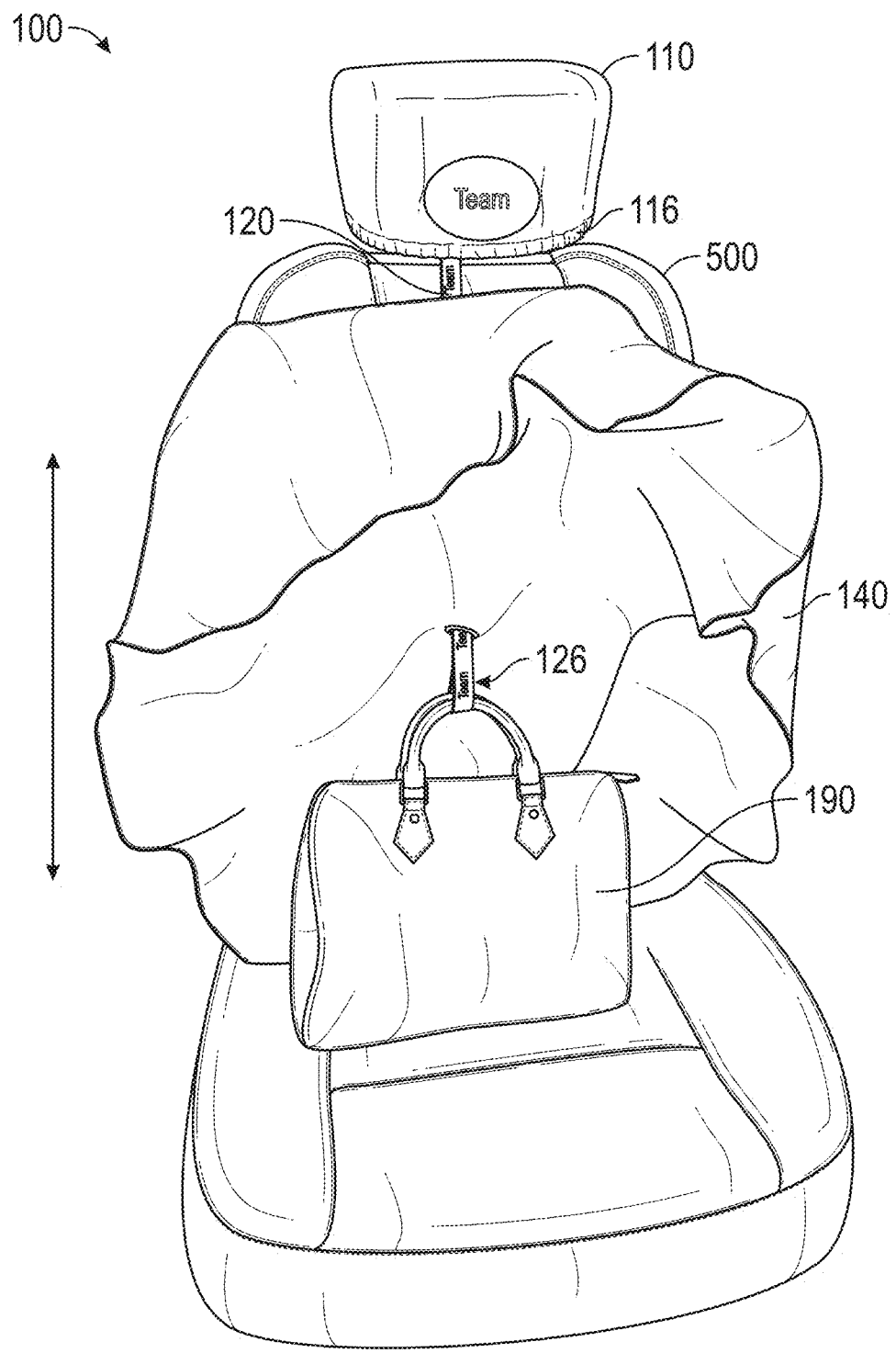
FIG. 2 is an example illustration of a front view of the integrated cargo and headrest cover, in accordance with a representative embodiment.

FIG. 1 and FIG. 2 are example illustrations of front views of an integrated cargo and headrest cover system 100, shown in a first position and a second position, respectively. The integrated cargo and headrest cover system 100 may cooperate with a seat having a headrest, such as the seat 500 of a vehicle having a vehicle headrest (shown covered by a headrest cover 110). The integrated cargo and headrest cover system 100 may generally be connected to a cargo 190 which may be placed on the seat of the vehicle. Cargo 190 may be, for example, a handbag or purse (shown hidden in dashed lines in FIG. 1), a briefcase, a laptop bag, or the like. The integrated cargo and headrest cover system 100 generally includes headrest cover 110, an elongated strap 120, and a cargo cover 140.

Headrest cover 110 may be structurally configured to cover the vehicle headrest (e.g., by partially covering, substantially covering, or entirely covering the vehicle headrest). In some aspects, headrest cover 110 may be structurally configured to conform to the vehicle headrest. For example, headrest cover 110 may be made of a fabric, such as a stretch woven material, spandex, polyester, cotton, or other woven and non-woven materials, or another material that may conform to the shape of the vehicle headrest. Headrest cover 110 may also, or instead, include a conformable portion 116 that may be used to adjust the fit of the headrest cover to the headrest and maintain a close fit therebetween. In some exemplary embodiments, conformable portion 116 may include an adjustable element, such as a drawstring and/or a cord stop, or a resilient element (e.g., an elastic band or gripping material). While conformable portion 116 may be shown exposed in certain views for clarity, it is to be understood that conformable portion 116 may also, or instead, be at least partially hidden from view (for example, by being tucked underneath a portion of the headrest).

Headrest cover 110 may have a front surface 112, generally facing the direction of the passenger's head when seated in the seat (i.e., oriented toward the front of the seat). As shown, headrest cover 110 may include decorative emblems or logos, and may be made in a variety of colors or styles to provide aesthetically pleasing choices for a variety of users.

Elongated strap 120 generally extends downwardly from front surface 112 of headrest cover 110. Elongated strap 120 includes a plurality of couplers (see, e.g., a first coupler 122 and a second coupler 124 of FIG. 9), and is releasably securable to itself, via one or more of the couplers, to form a loop 126 (see FIG. 3). The loop may be used to connect elongated strap 120 to cargo 190, such as through a strap, handle, or other connection point of the cargo, thereby retaining cargo 190 generally in position on the vehicle seat. Elongated strap 120 may have an elongated substantially rectangular shape, and may be formed of materials such as polypropylene, nylon, cotton, leather, simulated leather, other fabrics, or the like. In embodiments, elongated strap 120 may be any of the following: a strap tape, a tubular strap, an elastic strap, a rubberized strap, a semi-elastic polymeric strap, a non-stretch polymeric strap, a natural fiber strap, or a cordage.

Cargo cover 140 may be connected to the elongated strap, and in some cases may be connected above loop 126. Cargo cover 140 may be shaped and dimensioned to cover the cargo, and may also cover loop 126. In an aspect, cargo cover 140 may be substantially opaque to ultraviolet light, thereby protecting any cargo underneath cargo cover 140 from potentially harmful effects of sun exposure. For example, cargo cover 140 may be formed of a fabric that provides UV protection, by such means as UV-blocking treatments, specific weaving, fabric density, or the like.

FIG. 1 and FIG. 2 illustrate integrated cargo and headrest cover system 100 in different positions of use. Specifically, in the first position of FIG. 1, cargo cover 140 is positioned to cover cargo 190 such as by loosely draping cargo cover 140 over cargo 190. In the second position of FIG. 2, cargo cover 140 is positioned to make cargo 190 accessible; this position allows the user to connect or disconnect elongated strap 120 from cargo 190, or access cargo 190 as may be desired, for example, to remove an item therefrom. In general, cargo cover 140 may be positionable to various locations along elongated strap 120, for example by sliding cargo cover 140 along elongated strap 120, generally in the directions indicated by the directional arrow of FIG. 2. It will therefore be understood that FIGS. 1-2 represent just two of numerous possible positions of integrated cargo and headrest cover system 100.

Figure 3:
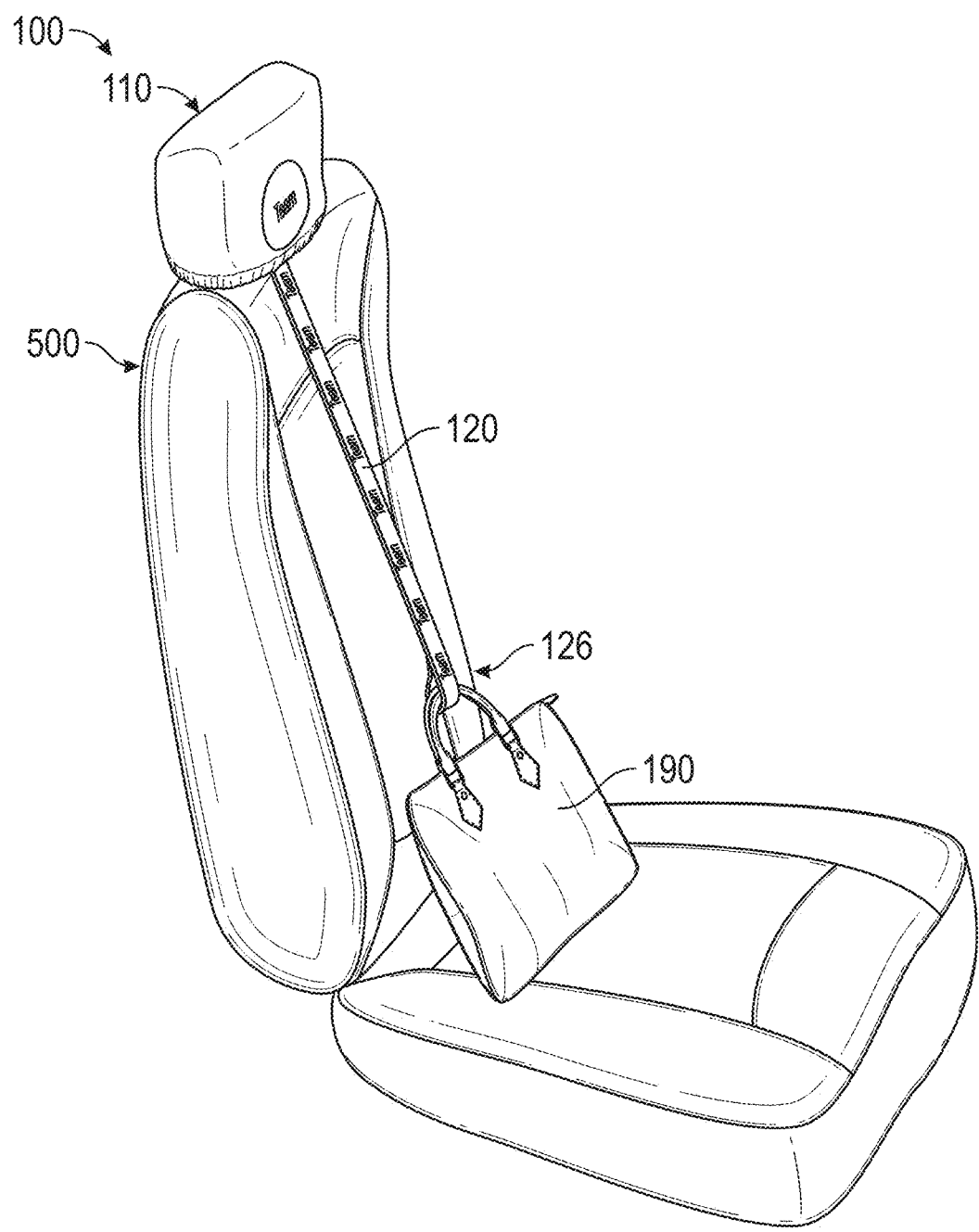
FIG. 3 is an example illustration of a side view of the integrated cargo and headrest cover, in accordance with a representative embodiment.

FIG. 3 is an example illustration of a side view of integrated cargo and headrest cover system 100, in accordance with a representative embodiment. In some cases, integrated cargo and headrest cover system 100 may include headrest cover 110 and elongated strap 120 without a cargo cover. In other cases, the cargo cover (e.g., cargo cover 140 of FIGS. 1-2 may be temporarily removed from integrated cargo and headrest cover system 100). The integrated cargo and headrest cover system as shown may therefore include any of the features discussed with reference to FIGS. 1-2, alone or in combination. As best seen in the view of FIG. 3, elongated strap 120 may form a loop 126 that may be used to connect to cargo 190. For example, elongated strap 120 may be passed through a portion of cargo 190 (such as the handles of the purse as illustrated) and connected back to itself to form loop 126. The configuration of loop 126 is discussed in more detail with respect to FIGS. 9-10.

Figure 4:
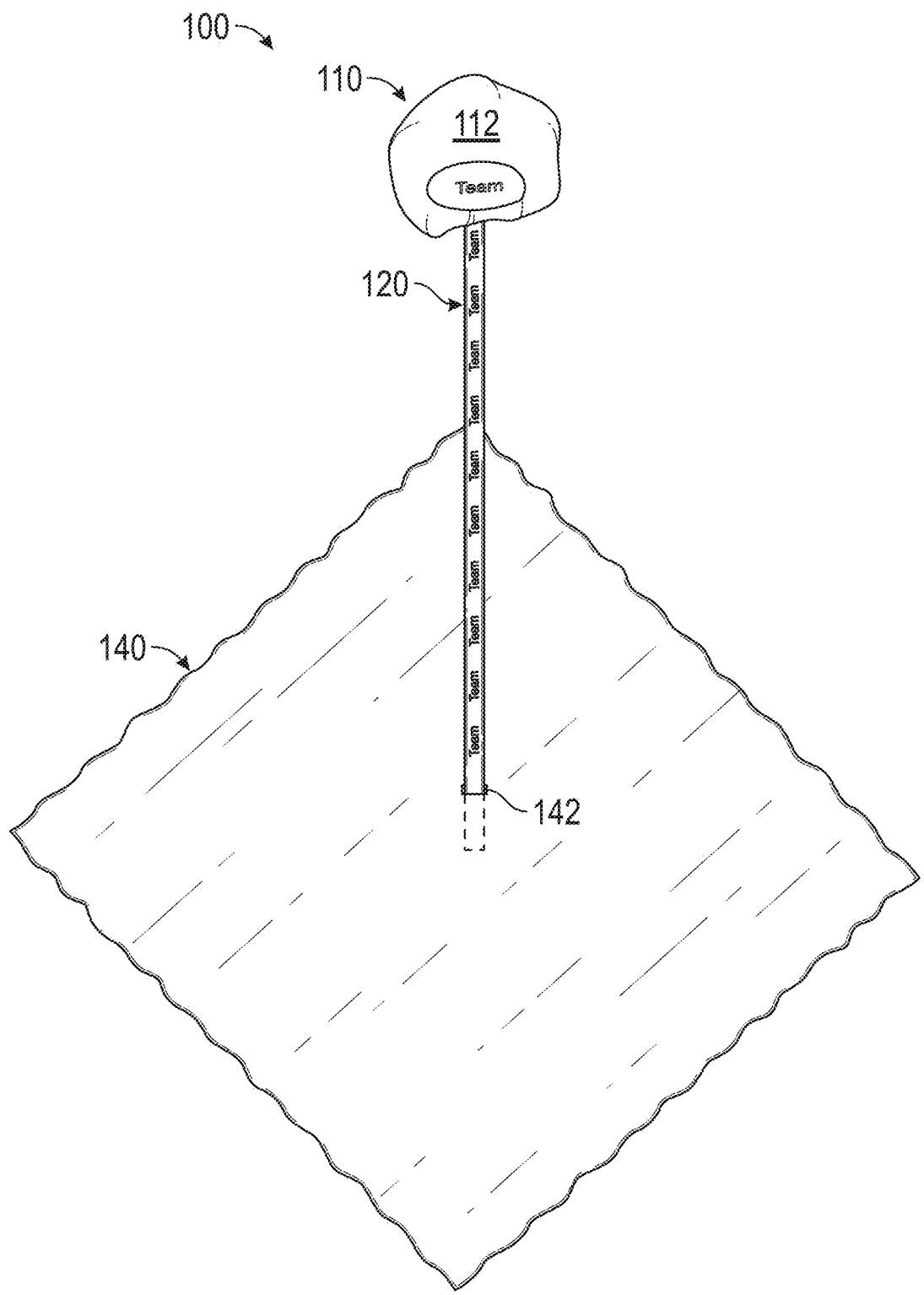
FIG. 4 is an example illustration of a top view of the integrated cargo and headrest cover, in accordance with a representative embodiment.

FIG. 4 is an example illustration of a top view of the integrated cargo and headrest cover system 100, in accordance with a representative embodiment, which may include any of the features discussed with reference to any of the previous figures. Cargo cover 140 may include an aperture 142 which may be located substantially in the center of cargo cover 140. Cargo cover 140 may be connectable to elongated strap 120 by passing elongated strap 120 through aperture 142, such that a portion of elongated strap 120 is positioned on top of cargo cover 140 (with respect to the orientation of the shown view) while another portion of elongated strap 120 is positioned below cargo cover 140 (see portion of elongated strap 120 shown hidden in dashed lines; this portion may include a loop as described elsewhere herein). Cargo cover 140 may be slidingly positionable along a length of elongated strap 120, which may adjust the size of the portion of elongated strap 120 positioned below cargo cover 140 (for instance, if a larger or smaller loop is desired based on the size of the cargo). Integrated cargo and headrest cover system 100 may be laid flat as shown and folded for storage when not in use.

Figure 5:
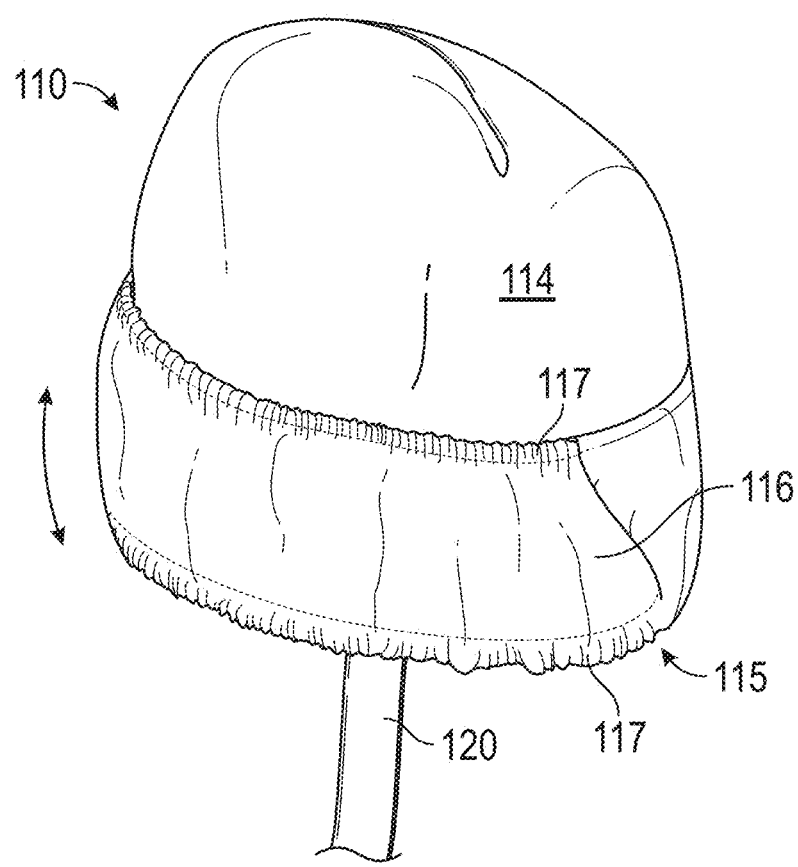
FIG. 5 is an example illustration of a rear view of a headrest cover, in accordance with a representative embodiment.

FIG. 5 is an example illustration of a rear view of headrest cover 110 showing rear surface 114, in accordance with a representative embodiment. In the shown embodiment, a lower end 115 of headrest cover 110 may include conformable portion 116, which may be similar to embodiments of the conformable portion discussed elsewhere herein. As shown, all or part of conformable portion 116 may be folded up or down, generally as indicated by the directional arrow, as may be desired to conform to a portion of the headrest. For example, conformable portion 116 may be folded down (see, e.g., FIG. 7) so as to wrap conformable portion 116 underneath a headrest, such as if the headrest is connected to the seat by one or more posts. In a case where the headrest is unitarily formed with the seat, conformable portion 116 may be folded up (as shown in FIG. 5) to maintain a smooth appearance. Conformable portion 116 may include one or more adjustable elements 117, such as elastic bands. One or more adjustable elements 117 may assist in stabilizing the position of headrest cover 110 on the headrest (e.g., so that headrest cover 110 does not move when in use).

Figure 6A:
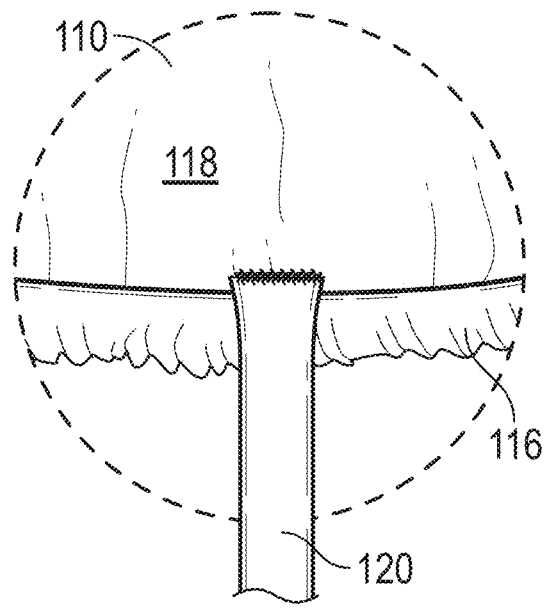
FIGS. 6A, 6B, and 6C are example illustrations of enlarged views of a portion of the headrest cover, in accordance with representative embodiments.
Figure 6B:
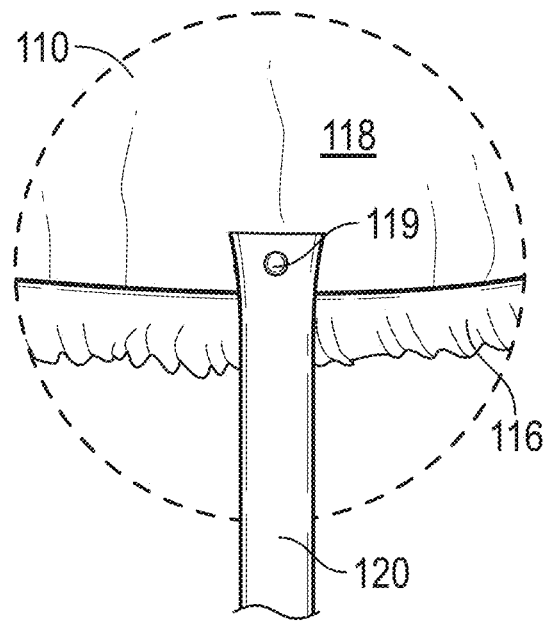
Figure 6C:
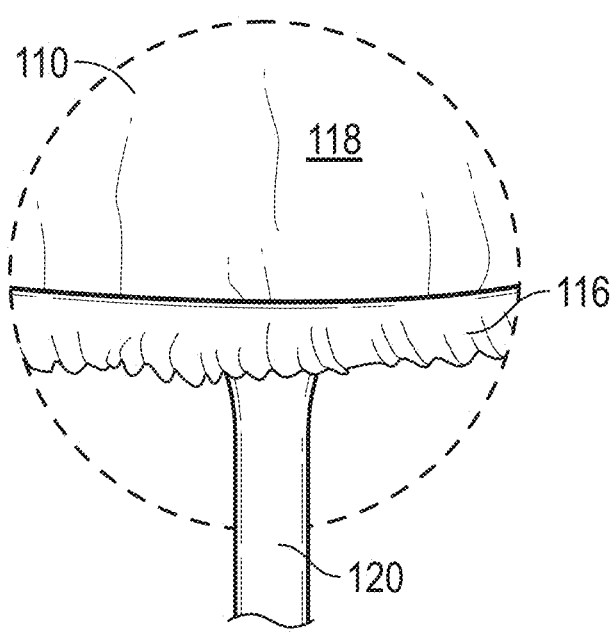

FIGS. 6A, 6B, and 6C are example illustrations of enlarged views of a portion of headrest cover 110, in accordance with representative embodiments. In particular, FIGS. 6A-6C show several ways in which elongated strap 120 may be connected to headrest cover 110. In the embodiment of FIG. 6A, elongated strap 120 is shown sewn to headrest cover 110. In this example, elongated strap 120 is shown sewn to headrest cover 110 in the area above conformable portion 116 on an interior 118 of headrest cover 110, and, when the headrest cover is in use, the sewn region is to be hidden from view behind the front surface of headrest cover 110.

In the embodiment of FIG. 6B, elongated strap 120 is shown removably connected to headrest cover 110 with a fastener 119, which may be a button, snap, hook and loop, magnetic coupler, or another type of fastener. Fastener 119 may be located on interior 118 of the front surface of headrest cover 110, allowing it to be hidden from view when in use. With this type of arrangement, the elongated strap 120 may be removed (non-destructively) from headrest cover 110 when not in use, and headrest cover 110 may optionally be used as a standalone element (in other words, without the other components of the integrated cargo and headrest cover system).

In the embodiment of FIG. 6C, elongated strap 120 is shown unitarily formed with headrest cover 110. In this arrangement, elongated strap 120 and headrest cover 110 may be formed of a shared piece of material. For example, elongated strap 120 and headrest cover 110 may both be formed in the same piece of an elastic, or otherwise stretchable, material, or other materials as described herein. Additional elements described herein may also be included in headrest cover 110 in this embodiment, such as conformable portion 116.

Figure 7:
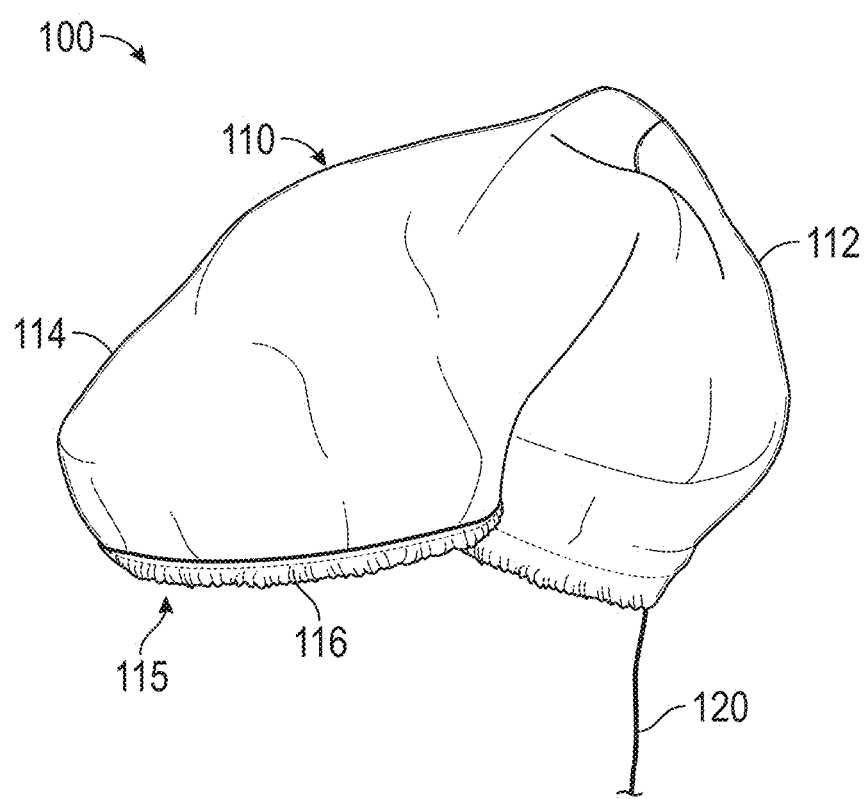
FIG. 7 is an example illustration of a side view of the headrest cover, in accordance with a representative embodiment.

FIG. 7 is an example illustration of a side view of the headrest cover 110, in accordance with a representative embodiment. The lower end 115 of headrest cover 110 may include conformable portion 116 on rear surface 114, which may be similar to a conformable portion as discussed elsewhere herein. As shown, conformable portion 116 may be folded down, for wrapping underneath at least a portion of the headrest. In this configuration, elongated strap 120 extends downwardly from front surface 112, and may rest against the vehicle seat (not shown).

Figure 8A:
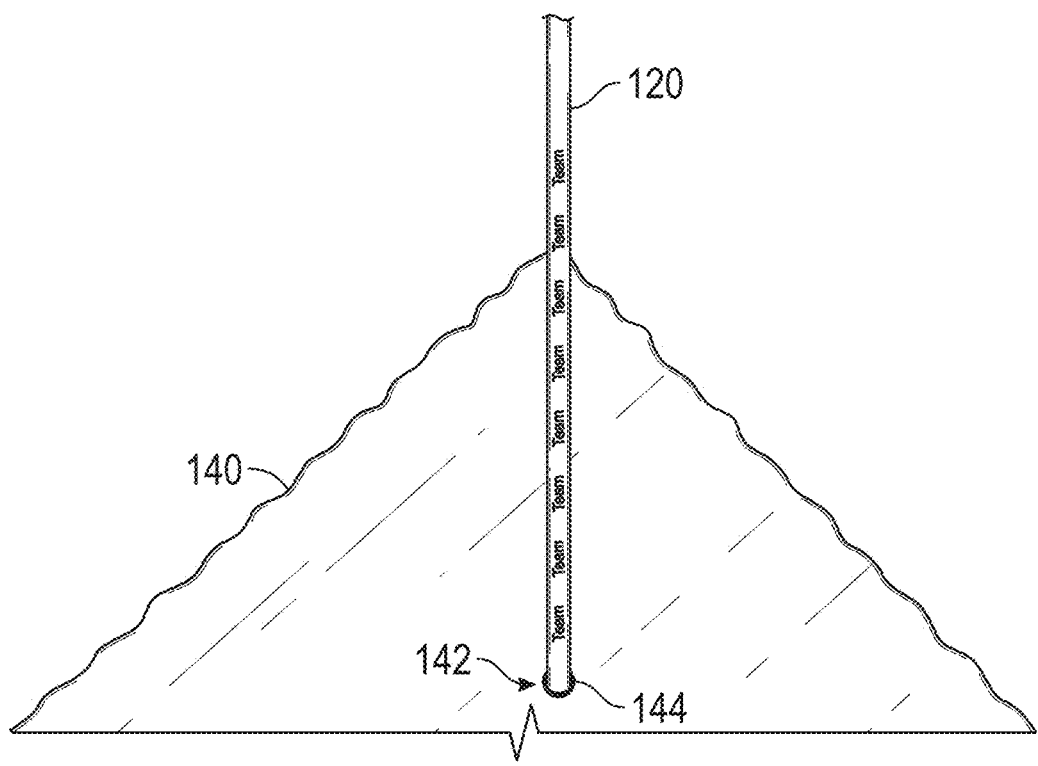
FIGS. 8A and 8B are example illustrations of enlarged views of a portion of a strap and a cargo cover, in accordance with representative embodiments.
Figure 8B:
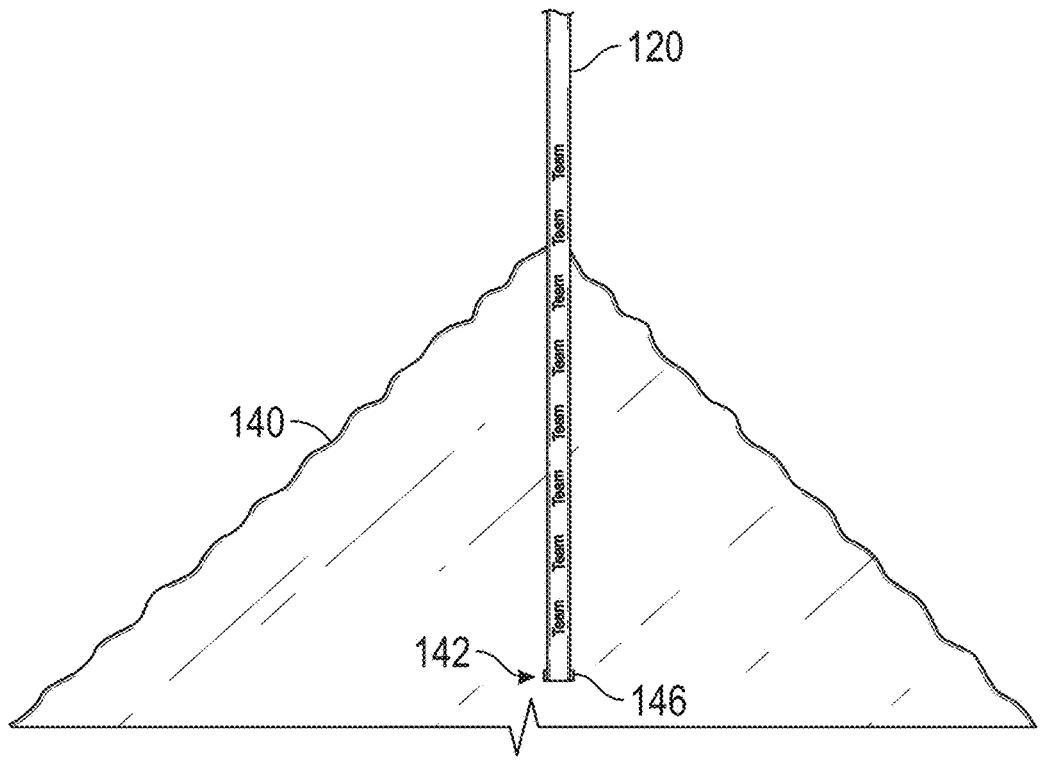

FIGS. 8A and 8B are example illustrations of enlarged views of a portion of elongated strap 120 and cargo cover 140, in accordance with representative embodiments. Cargo cover 140 may have an aperture 142, as shown in each embodiment. Aperture 142 may be located substantially in the center of the cargo cover, as shown, or may be offset from the center as may be preferred based on the size, shape, or style of cargo cover 140. Cargo cover 140 may be connected to elongated strap 120 by passing elongated strap 120 through aperture 142, in a manner similar to that discussed elsewhere herein. As shown in FIG. 8A, aperture 142 may include a grommet 144 which may substantially surround aperture 142. Grommet 144 may be structurally configured to closely fit elongated strap 120, so that cargo cover 140 may be held in position when slid up or down along cargo cover 140 (see FIG. 2). Grommet 144 may be brass, neoprene, or other material suitable for use with fabric. In some cases, grommet 144 may be covered by fabric. As shown in FIG. 8B, aperture 142 may include a slit 146, which may, or may not, include a seam, weld, fabric reinforcement, or other feature surrounding aperture 142. Slit 146 may be structurally configured to closely fit elongated strap 120.

Figure 9:
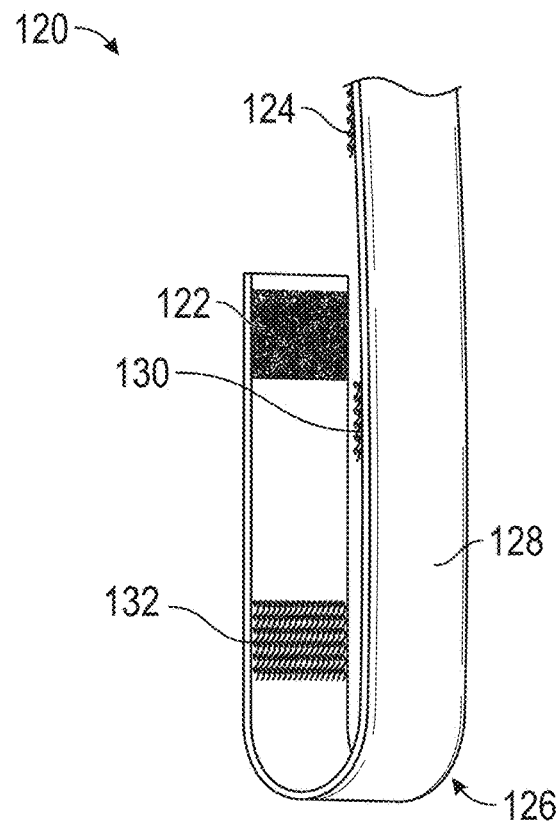
FIG. 9 is an example illustration of an enlarged view of a portion of the strap, in accordance with a representative embodiment.

FIG. 9 is an example illustration of an enlarged view of a portion of elongated strap 120, in accordance with a representative embodiment. Elongated strap 120 includes a plurality of couplers (e.g., a first coupler 122 and a second coupler 124), which may be hook and loop fasteners, magnetic fasteners, buttons, snaps, clips, buckles, or the like. The couplers may be generally positioned in offset relation (e.g., spaced apart from one another) along elongated strap 120. In an aspect, the couplers may all be oriented away from an exterior surface 128 of elongated strap 120, where exterior surface 128 is configured to face toward the passenger of the seat, and, in the area of loop 126, may face or contact the seat. This arrangement allows a passenger to comfortably use the seat while the integrated cargo and headrest cover system is positioned on the seat with the first coupler secured to the second coupler, as there will not be exposed fasteners that could potentially cause passenger discomfort, snag on clothing, or create other undesirable conditions for a passenger. This arrangement may also protect the seat from exposure to the couplers when the strap is not connected to cargo, as the couplers could potentially abrade seat materials, catch on fabrics, or otherwise mar the seat.

In a similar manner as discussed elsewhere herein, elongated strap 120 may be releasably securable (for example, configured for repeated connection and disconnection) to itself to form a loop 126. For example, first coupler 122 may be releasably secured to second coupler 124 to form loop 126, as may be seen, for example, in FIG. 3. In some scenarios, elongated strap 120 may include multiple couplers, each of which are configured for releasable securing to first coupler 122—such as second coupler 124, a third coupler 130, and a fourth coupler 132. By choosing to secure first coupler 122 to any one of the complementary couplers (second coupler 124, third coupler 130, or fourth coupler 132), the user may adjust the size of loop 126 as desired for different sizes of cargo or cargo attachment points. In addition, or instead, multiple couplers may be provided that are releasably securable to second coupler 124. In this sense, the size of elongated strap 120 and/or loop 126 may be considered to be adjustable.

Figure 10:
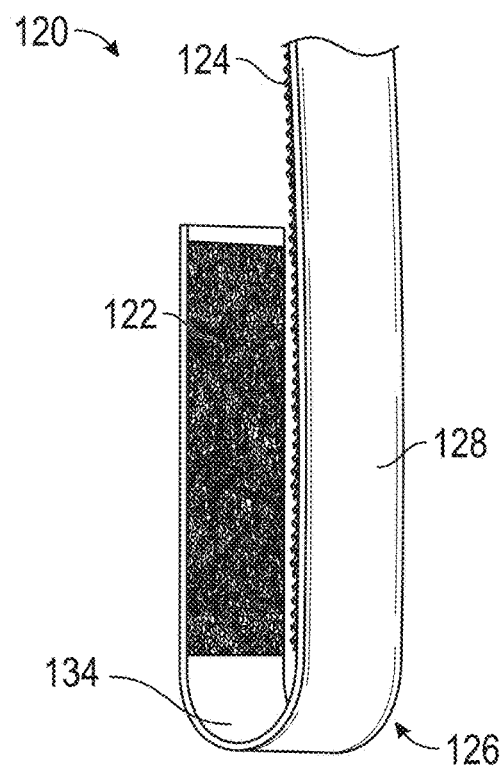
FIG. 10 is an example illustration of an enlarged view of a portion of the strap, in accordance with a representative embodiment.

FIG. 10 is an example illustration of an enlarged view of a portion of elongated strap 120, in accordance with a representative embodiment. Features of the shown embodiment may be similar to those described elsewhere herein, for example, in relation to the embodiment of FIG. 9. As shown, first coupler 122 and second coupler 124 are larger than the couplers shown in FIG. 9; as a result, a majority of the length of elongated strap 120 may include a coupler. First coupler 122 may be securable to second coupler 124 in numerous positions, thereby creating numerous different sizes of loop 126. In this sense, the size of elongated strap 120 and/or loop 126 may be considered to be continuously adjustable. In other embodiments, the size of first coupler 122 may be relatively small (e.g., sized as shown in FIG. 9) while second coupler 124 may extend over a majority of the length of elongated strap 120, or vice versa. While a gap is shown in between first coupler 122 and second coupler 124 (in other words, a region 134 of elongated strap 120 is shown having no coupler), this need not be the case. In some embodiments, first coupler 122 may abut second coupler 124 without a gap therebetween.

Figure 11:
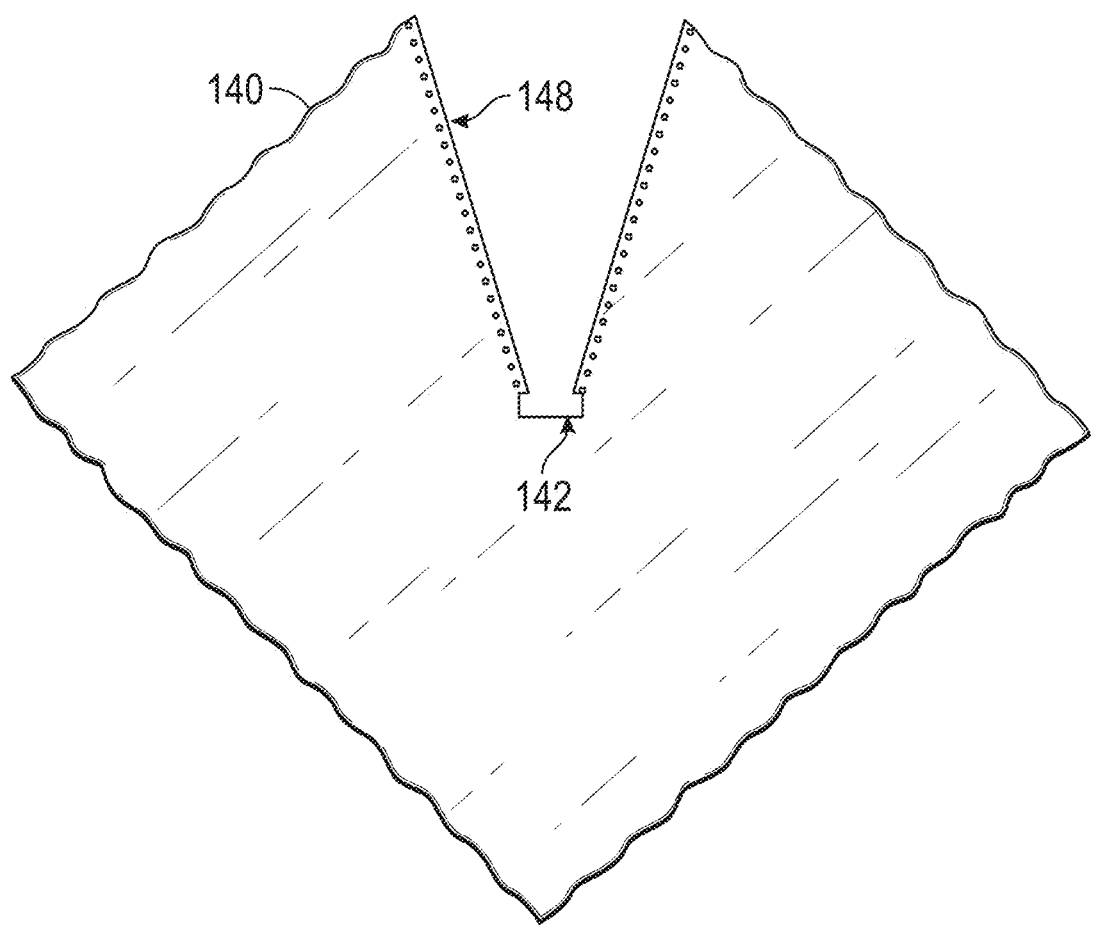
FIG. 11 is an example illustration of a top view of the cargo cover, in accordance with a representative embodiment.

FIG. 11 is an example illustration of a top view of cargo cover 140, in accordance with a representative embodiment. Cargo cover 140 may include any of the features discussed elsewhere herein. In some embodiments, cargo cover 140 may include one or more cover fasteners 148. Cover fasteners 148 may be hook and loop, buttons, snaps, magnetic couplers, or another type of fastener. As shown, cover fasteners 148 generally extend from an outer edge of cargo cover 140 to aperture 142. This configuration allows the cargo cover 140 to be positioned around elongated strap 120 (when cover fasteners 148 are disconnected) and secured to elongated strap 120 (by connecting cover fasteners 148). In some scenarios, this feature may improve ease of removing cargo cover 140 from the elongated strap.

In terms of use, a method of securing and covering a cargo 190 in a vehicle having a vehicle headrest and a seat 500 includes: (refer to FIGS. 1-11)

providing a headrest cover and cargo securing system 100 including:
  a headrest cover 110 structurally configured to conform to the vehicle headrest, the headrest cover having a front surface 112 and a rear surface 114;
  an elongated strap 120 extending downwardly from the front surface of the headrest cover;
  a plurality of couplers positioned in offset relation along the elongated strap, the plurality of couplers including a first coupler 122 and a second coupler 124, wherein the elongated strap is releasably securable to itself via the first coupler and the second coupler to form a loop 126; and
  a cargo cover 140 connected to the elongated strap above the loop, the cargo cover shaped and dimensioned to cover the loop and the cargo;

covering the vehicle headrest with the headrest cover with the elongated strap extending downwardly from the headrest cover along the seat;
placing the cargo on the seat;
positioning the elongated strap to secure the cargo (e.g., by passing the elongated strap through a handle of the cargo or similar);
securing the elongated strap to itself via the first coupler and the second coupler to form a loop connected to the cargo; and
positioning the cargo cover to cover the loop and the cargo.

The method may further include: slidingly positioning cargo cover 140 along a length of elongated strap 120 (see, e.g., FIG. 2 including directional arrow indicating direction of sliding cargo cover 140).

The method may further include: connecting elongated strap 120 to headrest cover 110, for example, with fastener 119 as described in FIG. 6B.

The method may further include: positioning at least one of first coupler 122 and second coupler 124 to adjust a size of the loop 126 (e.g., as described with reference to FIG. 9 and/or FIG. 10).

The embodiments of the integrated cargo and headrest cover system and methods of use described herein are exemplary and numerous modifications, combinations, variations, and rearrangements can be readily envisioned to achieve an equivalent result, all of which are intended to be embraced within the scope of the appended claims. Further, nothing in the above-provided discussions of the systems and methods should be construed as limiting the invention to a particular embodiment or combination of embodiments. The scope of the invention is defined by the appended claims.

I claim:

1. An integrated cargo and headrest cover system for cooperation with a vehicle headrest and a cargo, the system comprising:
    a headrest cover structurally configured to conform to the vehicle headrest, the headrest cover having a front surface and a rear surface;
    an elongated strap extending downwardly from the front surface of the headrest cover;
    a plurality of couplers positioned in offset relation along the elongated strap, the plurality of couplers including a first coupler and a second coupler, wherein the elongated strap is releasably securable to itself via the first coupler and the second coupler to form a loop; and
    a cargo cover connected to the elongated strap above the loop, the cargo cover shaped and dimensioned to cover the loop and the cargo.

2. The system of claim 1, wherein the elongated strap has an exterior surface, and the first coupler and the second coupler are positioned such that when the first coupler is secured to the second coupler both of the first coupler and the second coupler are oriented away from the exterior surface.

3. The system of claim 1, wherein the cargo cover includes an aperture located substantially in a center of the cargo cover; and the cargo cover is connected to the elongated strap by passing the elongated strap through the aperture.

4. The system of claim 3, wherein the cargo cover includes a grommet substantially surrounding the aperture.

5. The system of claim 3, wherein the cargo cover includes a cover fastener extending from an outer edge of the cargo cover to the aperture.

6. The system of claim 1, wherein the cargo cover is slidingly positionable along a length of the elongated strap.

7. The system of claim 1, wherein the elongated strap is removably connected to the headrest cover.

8. The system of claim 7, wherein the elongated strap is removably connected to the headrest cover by a fastener located on an interior of the front surface of the headrest cover.

9. The system of claim 1, wherein the elongated strap is unitarily formed with the headrest cover.

10. The system of claim 9, wherein the elongated strap and the headrest cover are formed of an elastic material.

11. The system of claim 1, wherein a lower end of the headrest cover includes a conformable portion.

12. The system of claim 1, wherein the cargo cover is substantially opaque to ultraviolet light.

13. A headrest cover and cargo securing system for cooperation with a vehicle headrest and a cargo, the system comprising:
    a headrest cover structurally configured to conform to the vehicle headrest, the headrest cover having a front surface and a rear surface;
    an elongated strap extending downwardly from the front surface of the headrest cover; and
    a plurality of couplers positioned in offset relation along the elongated strap, the plurality of couplers including a first coupler and a second coupler, wherein the elongated strap is releasably securable to itself via the first coupler and the second coupler to form a loop; and
    wherein the elongated strap has an exterior surface, and the first coupler and the second coupler are positioned such that when the first coupler is secured to the second coupler both of the first coupler and the second coupler are oriented away from the exterior surface.

14. The system of claim 13, wherein the elongated strap is unitarily formed with the headrest cover.

15. The system of claim 13, wherein the elongated strap is removably connected to the headrest cover.

16. A method of securing and covering a cargo in a vehicle having a vehicle headrest and a seat, the method comprising:
    providing a headrest cover and cargo securing system including:
        a headrest cover structurally configured to conform to the vehicle headrest, the headrest cover having a front surface and a rear surface;
        an elongated strap extending downwardly from the front surface of the headrest cover;
        a plurality of couplers positioned in offset relation along the elongated strap, the plurality of couplers including a first coupler and a second coupler, wherein the elongated strap is releasably securable to itself via the first coupler and the second coupler to form a loop; and
        a cargo cover connected to the elongated strap above the loop, the cargo cover shaped and dimensioned to cover the loop and the cargo;
    covering the vehicle headrest with the headrest cover with the elongated strap extending downwardly from the headrest cover along the seat;
    placing the cargo on the seat;
    positioning the elongated strap to secure the cargo;
    securing the elongated strap to itself via the first coupler and the second coupler to form a loop connected to the cargo; and
    positioning the cargo cover to cover the loop and the cargo.

17. The method of claim 16, further including:
positioning at least one of the first coupler and the second coupler to adjust a size of the loop.

18. The method of claim 16, further including:
slidingly positioning the cargo cover along a length of the elongated strap.

19. The method of claim 16, further including:
connecting the elongated strap to the headrest cover.

\* \* \* \* \*